Nov. 24, 1936.    H. T. COTTRELL    2,062,087
HOSE SUPPORTER
Original Filed July 9, 1935
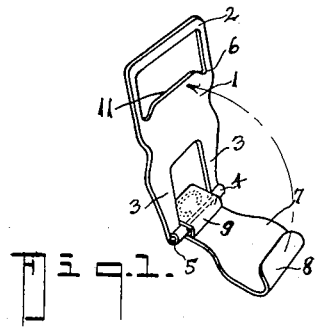
Fig.1.
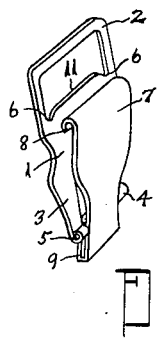
Fig.2.
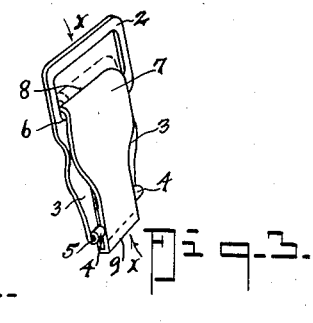
Fig.3.
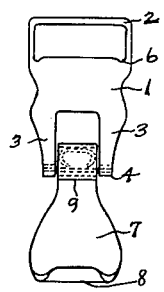
Fig.4.
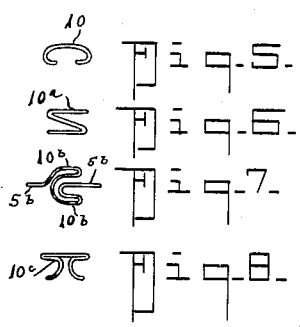
Fig.5.
Fig.6.
Fig.7.
Fig.8.
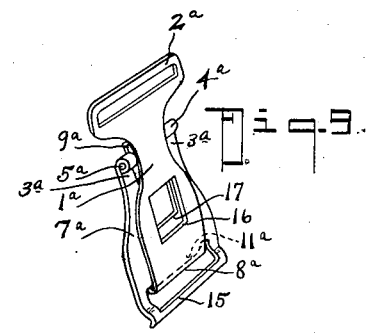
Fig.9.
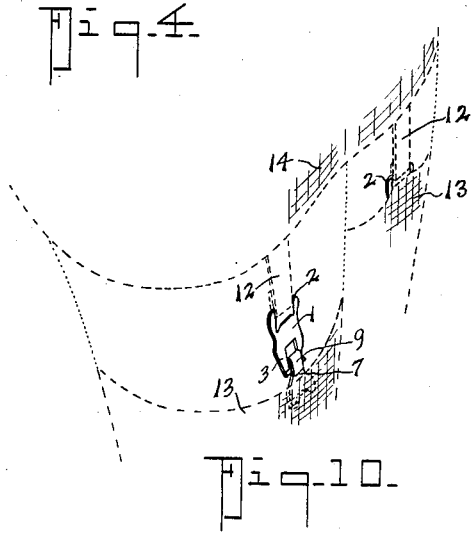
Fig.10.
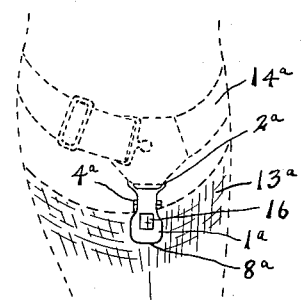
Fig.11.
Inventor
HERBERT T. COTTRELL
By Albert E Dieterich
Attorney Patented Nov. 24, 1936

2,062,087

UNITED STATES PATENT OFFICE 2,062,087

HOSE SUPPORTER

Herbert T. Cottrell, Vancouver, British Columbia, Canada

Application July 9, 1935, Serial No. 30,546
Renewed April 13, 1936

6 Claims. (Cl. 24—248)

The present invention relates to certain new and useful improvements in hose supporters and it especially has for its object to overcome certain deficiencies in, and embody certain improvements over, the hose supporter which is disclosed in an application for patent recently filed by one Charles E. Sellen.

The Sellen hose supporter consists generally of a frame member or base member having a transverse bar and having a relatively large opening below the bar; a hose-engaging member having a hook-like portion to receive a part of a hose, with the hose passed over the hook-like portion and in part located within the hook-like portion and over the bar; the base member, below its opening, having a ledge for supporting the hose-engaging member as a pivot therefor, the base member and the hose-engaging member being elastically held together by a rubber band passed through said opening and through a slot in the hose-engaging member. Several objections to the Sellen hose supporter have become manifest during the practical use thereof, among which may be mentioned the following: the fact that the movement of the hose-engaging member is limited by the angle of the supporting ledge to an arc of approximately forty-five degrees; the rubber band does not prevent lateral displacement or misalignment of the hose-supporting member, and the rubber band soon wears out; further, the frame member and the hose-engaging member must be provided with split loops for the assembling of the rubber band and the two members, the "splits" at times cutting the rubber, not only while the parts are being assembled, but also after the supporter is put into use. My invention therefore has for an object to provide a hose supporter which, while retaining the advantages and benefits of the Sellen supporter, has none of its disadvantages.

Again, the Sellen supporter lacks a convenient means to release it from the hose without danger of tearing the garment or starting runs therein. It is therefore another object of my invention to provide a supporter in which simple, easily operated and effective means are provided by which the supporter may be released to free the hose without injury to the same.

Other objects of the invention may in part be obvious and in part be pointed out hereinafter.

To the attainment of the aforesaid objects and ends the invention further resides in those novel combinations and arrangement of parts, all of which will be first fully described in the following detailed description and then be pointed out in the appended claims, reference being had to the accompanying drawing, in which:—

Figure 1 is a perspective view of the clasp which constitutes the essential part of my present invention, the clasp being in an open position.

Figure 2 is a perspective view of the same with the hose-engaging member swung up toward the base member ready to be secured.

Figure 3 is a perspective view similar to Figures 1 and 2 with the clasp in the secured position.

Figure 4 is a face elevation of the clasp, fully opened, corresponding to the perspective view shown in Figure 1.

Figures 5 to 8, inclusive, are detailed views of different forms of springs constituting a part of my invention.

Figure 9 is a perspective view of a modified form of clasp, hereinafter specifically referred to.

Figure 10 is a perspective view showing the clasp of Figures 1 to 4, inclusive, in use.

Figure 11 is a perspective view showing the clasp of Figure 9 in use.

In the drawing, in which like numerals indicate like parts in all the figures, I represents the base member which is slotted at its upper end, as at 2 to permit its being secured to the elastic 12 which depends from the garment 14. The base member I is also provided at its end opposite the slot 2 with furcations 3 whose ends are formed into hinge pin holding bearings 4 in which the ends of the hinge pin 5 are carried, the hinge pin passing across the space between the furcations 3—3.

The base member at the sides of the slot 2 is recessed, as at 6, to provide a lip II over which the hook end 8 of the hose-engaging member 7 is adapted to engage.

The hose engaging member 7 is provided at its end which is opposite the hook end 8 with an elongated loop 9 that projects into the space between the furcations 3—3 and is pierced by the hinge pin 5 and has a spring member 10, located in the loop 9, which continuously tends to force the loop in a direction to hold the hinge pin 5 against that end of the loop which is nearest the hook end 8 of the hose-engaging member 7 (see Figures 1 and 4).

The hose is indicated in Figure 10 by the reference numeral 13. As will be seen by reference to Figure 10, in order to secure the supporter to the hose 13 the hose-engaging member 7 is slipped under the hose and then moved upwardly in the direction of the arrow in Figure 1 through the position of Figure 2, to the position of Figure 3, the member 7 being at the same time moved upwardly with respect to the member 1 so that the hook end 8 will press into the slot 2 and over the lip 11. As soon as the parts have reached the position shown in dotted lines in Figure 3, pressure tending to move the member 7 upwardly is released and consequently the hook end 8 (with the hose 13 in its bite) is brought into engagement with the lip 11 by virtue of the action of the spring 10. The parts then have assumed the position shown on the "left leg" in Figure 10 (right hand side of the figure).

In Figures 9 and 11 I have shown a modification of the invention and by reference to these two figures it will be observed that the base member 1a is formed with a loop 2a for attachment to the garter 14a and the base member is provided with the hook end 8a and the elongated loop 9a, while the hose-engaging member 7a is provided with furcations 3a, hinge pin holding bearings 4a, and an elongated slot 15 into which the lip 11a projects. The members 1a and 7a in this embodiment of the invention are provided with openings 16 and 17, if desired.

When this embodiment of the invention is used the lower end of the member 7a is pushed upwardly with respect to the member 1a to release the hook end 8a. Then the member 7a is placed under the hose 13a and the member 1a is placed over the hose. The members 1a and 7a are then moved toward each other in substantially parallel planes until the hook end 8a registers with the opening 15. The parts are then pressed together and the hook end 8a is thus brought under the lip 11a where it is held by virtue of the spring contained in the elongated loop 9a.

In Figures 9 and 11 those parts which perform corresponding functions and are of corresponding structure to similar parts in the preceding figures bear the same reference numerals plus the index letter a, so a further description thereof is thought to be unnecessary.

In Figures 6, 7 and 8 are shown slightly different forms of spring members, the one in Figure 6 being numbered 10a, that in Figure 8 being numbered 10c. The springs shown in Figures 5, 6 and 8 function solely as such. In Figure 7, however, the spring, numbered 10b, is also made to function as the hinge pin by arranging its ends 5b in alignment to fit within the hinge pin holding bearings 4. When the combined hinge pin and spring member of Figure 7 is used, the hose-engaging member 7 is balanced, as it were, on the spring elements 10b—10b, the arrangement, however, being such that when the hook end 8 is in the slot 2 it will be seated over and held in cooperation with the lip 11 as before.

From the foregoing it will be seen that my invention is provided with a positive and efficient clasp means which is substantially flat on the side adjacent the hose, which will lie flat against the wearer's leg, minimizing wear on overlying garments, eliminating undesirable projections and permitting the hose supporter to be worn with the thin garments of today without leaving any tell-tale mark that a hose clasp is present beneath.

My invention also provides a hose clasp that will grip the top portion of the hose firmly and securely without taking up the hose circumferentially, thus avoiding the tendency to tighten the hose around the leg. The invention, further, provides a device which will occupy a minimum of space between the elastic suspension element and the parts of the hose clasp, thereby permitting an unusually long suspending element and greater comfort and freedom to the wearer. Again, the invention provides a device which will grip uniformly over a broad area and thereby minimize the danger of runs or tears in the relatively delicate hose of today, which is to be directly contrasted with the generally used button type of supporter where a portion of the hose is placed over a rubber button and a sliding clamp secures a very limited number of threads in direct contact with the button. (It is generally recognized that this rubber button type of hose supporter causes runs and the trade generally provides some means of preventing such runs caused in the upper part of the hose from being communicated to the lower portion of the hose. These objectionable features are minimized, if not wholly eliminated, by my device, for the reason that the broad contact, or bearing surface, affords a substantially uniform strain over a relatively large area of hose, and thus reduces the likelihood of runs to a minimum.)

In order to release the clasp from the hose it is only necessary, with the thumb and finger engaging the ends of the clasp, to apply pressure in the direction of the arrows x in Figure 3; because of the projecting end of the loop 9 this action not only effects a release of the hook end 8 from the lip 11, but also causes the hose-engaging member 7 to swing outwardly in a direction opposite to that of the arrow in Figure 1, thereby instantly releasing the hose. It will thus be seen that my invention also provides a hose clasp which may not only be quickly and easily attached to the hose but may also be quickly and easily detached therefrom. Furthermore, the clasp may be attached to the hose either at a place close to the top edge of the hose or at any desired distance down from the top edge thereof.

From the foregoing description, taken in connection with the accompanying drawing, it is thought that the complete construction, operation and advantages of the invention will be clear to those skilled in the art to which it relates.

What I claim is:

1. In a hose supporter, a base member having a slot adjacent one end and having its other end bifurcated, the furcations having hinge pin bearing elements, said base member having a lip at one edge of the slot, a hose-engaging member having an elongated loop to lie between said furcations, said hose-engaging member having a hook portion at its free end for entering said slot and cooperating with said lip to clasp a hose between them, a hinge pin carried by said bearing elements and passing through said loop, and elastic means to hold said hook portion in engagement with said lip.

2. In a hose supporter, a base member having a slot adjacent one end and having its other end bifurcated, the furcations having hinge pin bearing elements, said base member having a lip at one edge of the slot, a hose-engaging member having an elongated loop to lie between said furcations, said hose-engaging member having a hook portion at its free end for entering said slot and cooperating with said lip to clasp a hose between them, a hinge pin carried by said bearing elements and passing through said loop, and elastic means to hold said hook portion in engagement with said lip, said elastic means comprising a spring located within said elongated loop in cooperation therewith and with said hinge pin.

3. In a hose supporter, a base member having a slot adjacent one end and having its other end bifurcated, the furcations having hinge pin bearing elements, said base member having a lip at one edge of the slot, a hose-engaging member having an elongated loop to lie between said furcations, said hose-engaging member having a hook portion at its free end for entering said slot and cooperating with said lip to clasp a hose between them, a hinge pin carried by said bearing elements and passing through said loop, and elastic means to hold said hook portion in engagement with said lip, said elastic means comprising a spring located within said elongated loop in cooperation therewith and with said hinge pin, said spring and said hinge pin comprising a unitary member.

4. In a hose supporter, two cooperative members one of which has a slot and a bifurcated portion, the other of which has an elongated loop and a hook portion, a hinge pin carried by said bifurcated portion and passing through said loop, the loop being located in said bifurcated portion, said hook portion being designed to enter said slot and hook over an edge thereof for purposes described, and spring means continuously tending to hold said loop with one extremity thereof against said hinge pin.

5. In a hose supporter, two cooperative members one of which has a slot and a bifurcated portion, the other of which has an elongated loop and a hook portion, a hinge pin carried by said bifurcated portion and passing through said loop, the loop being located in said bifurcated portion, said hook portion being designed to enter said slot and hook over an edge thereof for purposes described, and spring means continuously tending to hold said loop with one extremity thereof against said hinge pin, said spring means and said hinge pin constituting a unitary member.

6. In a hose supporter, two cooperative members one of which has a slot and a bifurcated portion, the other of which has an elongated loop and a hook portion, and a hinge pin carried by said bifurcated portion and passing through said loop, the loop being located in said bifurcated portion, said hook portion being designed to enter said slot and hook over an edge thereof for purposes described.

HERBERT T. COTTRELL.